Aug. 24, 1943.    R. S. SANFORD    2,327,970
BRACKET
Filed April 3, 1941
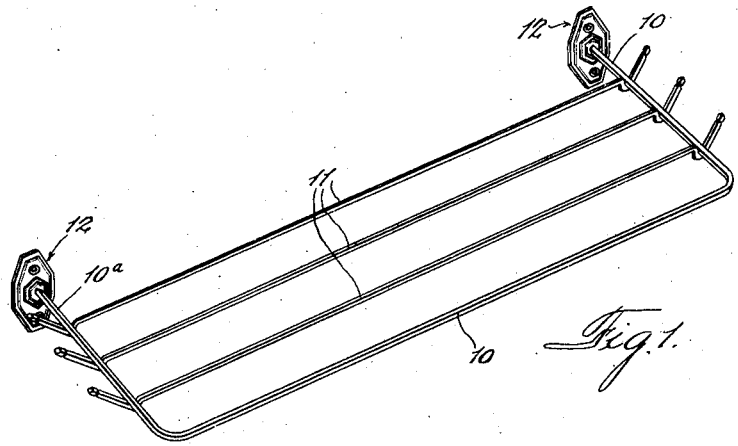
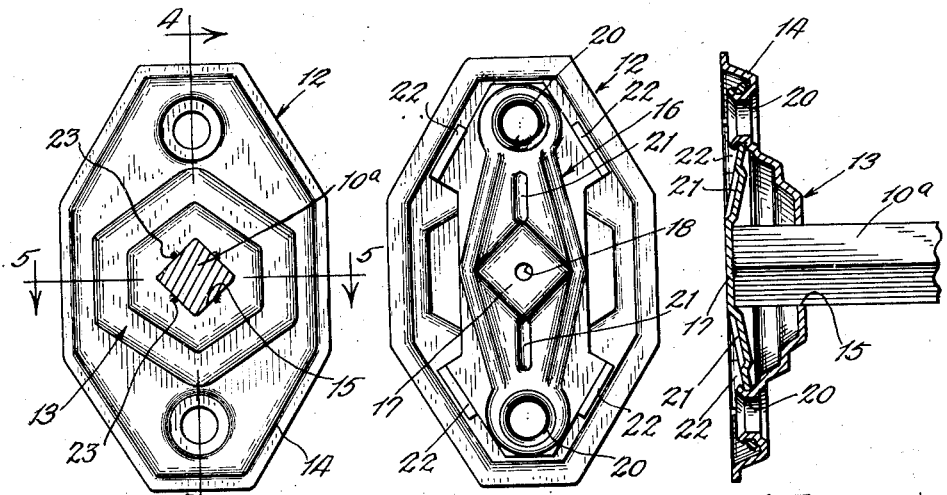
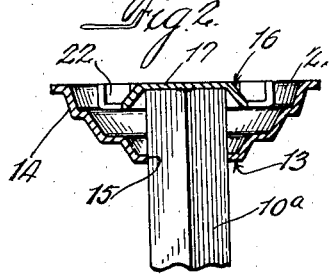
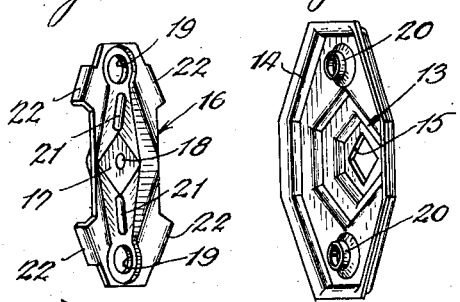
Fig. 1. Fig. 2. Fig. 3. Fig. 4. Fig. 5. Fig. 6.
Inventor
Roy S. Sanford
By Thiess, Olson & Mecklenburg
Attys.

Patented Aug. 24, 1943

2,327,970

UNITED STATES PATENT OFFICE 2,327,970

BRACKET

Roy S. Sanford, Oakville, Conn., assignor to The Autoyre Company, Incorporated, Oakville, Conn., a corporation of Connecticut Application April 3, 1941, Serial No. 386,601

5 Claims. (Cl. 248—223)

This is a continuation in part of applicant's copending application Serial No. 321,850, filed March 2, 1940, for Welded connection and method of making.

This invention relates to a bracket and has special reference to a means for holding a fixture in a fixed relation with a wall or other support.

More particularly, this invention relates to a bracket comprising a member having a front face and an angularly extending peripheral flange, the member having an aperture in the front face thereof for receiving a portion of a fixture supported by the bracket. A backing plate is fixed to the member at the rear of the aperture and in a spaced relation therewith, the portion of the fixture extended through the aperture being welded to the backing plate and being supported thereby and being further supported at a spaced point therefrom by the material bounding the aperture. Means project rearwardly from the front face of the member for engagement with the backing plate for obtaining the above fixed relation.

The bracket of the present invention is relatively small and supports a fixture of comparatively heavy weight. For example, in the drawing a towel rack is illustrated as a fixture and is supported by the bracket, the towel rack in turn supporting a supply of towels. The towel rack extends outwardly at a right angle to the bracket and a portion of the fixture is welded to the backing plate thereof. The weight of the fixture supported by the bracket pulls directly against the weld with a very substantial leverage. The present invention contemplates relieving the strain on the weld by supporting the fixture at a spaced point therefrom without the necessity of increasing the size of the bracket.

The bracket is formed preferably of a member having a front face and an angularly extending peripheral flange of stepped cross section. The face or front step of the member of the bracket is apertured for receiving a portion of a fixture to be supported by the bracket and a backing plate is fixed to the member at the rear of the aperture and in a second step of the member. The fixture portion extending through the aperture is welded to the backing plate and is supported thereby and is further supported at a spaced point therefrom by the material bounding the aperture. In this connection the welded portion of the backing plate is preferably substantially in the plane of the rear edge of the peripheral flange so that a maximum spacing is had between the weld and the support formed by the material bounding the aperture in the front step of the member to which the backing plate is affixed. Thus the fixture is supported at one end thereof by a weld to a backing plate and is supported in a spaced relation therefrom by the material bounding the aperture through which a portion of the fixture is extended, thereby relieving direct pressure on the weld.

The aperture in the front face of the bracket through which a portion of the fixture extends is preferably of substantially the same size and shape as the periphery of the fixture extended therethrough, only sufficient clearance being provided to permit the fixture to be inserted through the aperture. The welded connection is formed inside of the bracket and is hidden from view. Bars such as are employed in the manufacture of a towel rack or the like are cut from long rods or from a wire rolled on a spool, and while it is the purpose to cut the rod at right angles to the axis thereof, this operation is not always accurately performed and the end of the rod may extend at a more or less obtuse or acute angle with respect to the axis of the rod. Particularly is this true where the towel bar to be formed is bent into substantially U shape whereby the bending process results in the provision of end surfaces which may be slightly off a plane at right angles to the axis of the bar.

If the portion of the bar to be engaged with the bracket is not squarely at right angles with the axis of the bar, then in disposing the bar and bracket in a welding machine one edge of the face of the end of the bar is in contact with the backing plate and the opposed edge is spaced slightly therefrom. The welded connection thus effected is not of good appearance and when plated or painted, as is usually done, an unsightly condition is obtained because of the exposure of a portion of the rod which the plating or coating does not cover. Thus, in addition to the strength of the support for the fixture obtained in the present construction, a possible unsightly condition is also obviated, the weld being hidden from sight.

One of the objects of this invention is to provide a bracket of the type indicated above wherein the connection between the fixture supported by the bracket and the bracket is not exposed to view.

Another object of this invention is to provide a bracket of the hereinabove mentioned type in which a maximum strength is imparted to the welded connection by relieving direct pressure thereon.

Other objects and advantages of this invention will hereinafter be more particularly pointed out and, for a more complete understanding of the characteristic features of this invention, reference may now be had to the following description when taken together with the accompanying drawing, in which latter:

Figure 1 is a perspective view of a fixture supported by a bracket, the latter embodying the features of this invention;

Fig. 2 is a front elevational view of a bracket embodying the features of this invention, a portion of a fixture being shown in section as supported thereby;

Fig. 3 is a rear elevational view of Fig. 2;

Fig. 4 is a vertical central sectional view taken on the line 4—4 of Fig. 2;

Fig. 5 is a plan sectional view taken on the line 5—5 of Fig. 2; and

Fig. 6 is a perspective view of the parts of the bracket in a disassembled condition.

Referring now more particularly to the drawing, a towel rack is illustrated as comprising a substantially U-shaped wire supporting member 10 having spaced rods 11 extending between the arms of the U-shaped member. The ends 10a of the U-shaped member 10 are secured to a pair of spaced brackets 12, the brackets 12 embodying the features of this invention. While a towel rack has been shown in the drawing it is, of course, to be understood that various other fixtures may be substituted therefor and that the portions 10a of the U-shaped member 10 represent portions which may be extended from any fixture adapted to be supported by a wall or other support.

Each of the brackets 12 comprises a member 13 having a front face and an angularly extending peripheral flange 14 of stepped cross section as shown more particularly in Fig. 4. The member 13 has an aperture 15 in the face of the front step thereof for receiving the portion 10a of the fixture. The member 13 is preferably of resilient sheet metal and is preferably formed in a single piece.

A backing plate 16 preferably of sheet metal is fixed to the member 13 at the rear of the aperture 15. A medial portion 17 of the backing plate 16 is substantially flat and the end of the fixture portion 10a is welded thereto in any usual manner. It is preferable to provide an offset portion 18 extending inwardly or forwardly toward the fixture portion, the end of the bar or fixture portion 10a engaging the offset portion upon extension thereof through the aperture 15. Pressure is applied to the bar 10a by the welding machine in the direction of the bracket, the bracket being held stationary, and after the weld is effected the material of the offset portion 18 is deformed into the condition shown in Fig. 4. Thus the offset portion is returned to the normal plane of the flattened portion thereof. In this condition arcing is initiated in the welding machine from a central portion of the two elements sought to be welded together outwardly therefrom to effect a weld of maximum strength. However, as aforesaid, any welding operation may be employed.

Portions of the backing plate 16 extending outwardly of the medial flattened portion 17 are preferably embossed, the ends of the embossed portions being provided with apertures 19 which engage eyelets 20 preferably formed integrally with a second step of the member 13. The eyelets 20 extend through the apertures 19 and are beaded thereover to effect the aforesaid fixed relation between the backing plate 16 and the face plate or member 13. The flattened portion 17 of the backing plate 16 lies substantially in the plane of the rear edge of the peripheral flange 14. The first step of the face plate or member 13 is substantially spaced from the flattened portion 17 of the backing plate 16 so that support for the bar 10a is obtained not only at the weld but at a point spaced therefrom by the material bounding the aperture 15.

The backing plate 16 is embossed in one direction as above stated and is also embossed in the opposite direction by the provision of radial embossments 21 which tend to strengthen the backing plate. Also the backing plate is provided with legs 22 which extend rearwardly from a peripheral portion of the backing plate, the legs terminating in substantially the plane of the rear edge of the peripheral flange 14.

In order to insure that the fixture portion 10a is closely held by the member 13 after being inserted through the aperture 15 and welded to the backing plate 16, portions of the front step of the member 13 may be punched in around the fixture 10a as indicated by the reference numeral 23 in Fig. 2. While the terms "weld" and "welded" have been used throughout the specification, it will of course be understood that other methods of fixedly securing the fixture portions 10a to the back plate 16 may be employed.

While but a single embodiment of this invention is herein shown and described, it is to be understood that various modifications thereof may be apparent to those skilled in the art without departing from the spirit and scope of this invention and, therefore, the same is only to be limited by the scope of the prior art and the appended claims.

I claim:

1. In a bracket of the character described, a member having a front face and an angularly extending peripheral flange, said member having an aperture in said front face for receiving a portion of a fixture supported by said bracket, a backing plate, and means projecting rearwardly from the front face of said member for engaging said backing plate fixedly to support said backing plate at the rear of said aperture and in spaced relation to said front face, said fixture portion being fixedly secured at one end to said backing plate for support thereby and being further supported at a point spaced from said end by the material bounding said aperture.

2. In a bracket of the character described, a member having a front face and an angularly extending peripheral flange, said member having an aperture in said front face for receiving a portion of a fixture supported by said bracket, a backing plate having apertures adjacent the opposite ends thereof and eyelets formed integrally with and projecting rearwardly from the front face of said member through said apertures in said backing plate for supporting said backing plate at the rear of said apertured front face and in spaced relation thereto, said eyelets permitting the passage of fastening means therethrough for attaching said bracket to a supporting wall, said fixture portion being fixedly secured to said backing plate for support thereby and being further supported at a spaced point therefrom by the material bounding said aperture in said front face.

3. In a bracket of the character described, a member having a front face and an angularly extending peripheral flange of stepped cross section, said member having an aperture in the front step thereof for receiving a portion of a fixture supported by said bracket, and a backing plate fixed to said member at the rear of said aperture and in a second step thereof, said fixture portion being welded to said backing plate and being supported thereby and being further supported at a spaced point therefrom by the material bounding said aperture, the welded portion of said backing plate being substantially in the plane of the rear edge of said peripheral flange.

4. In a bracket of the character described, a member having a front face and an angularly extending peripheral flange, said member having an aperture in said front face thereof for receiving a portion of a fixture supported by said bracket, a backing plate fixed to said member at the rear of said aperture and in a spaced relation therewith, said fixture portion being fixedly secured to said backing plate and being supported thereby and being further supported at a spaced point therefrom by the material bounding said aperture, and a plurality of projections on said backing plate extending rearwardly therefrom and terminating in the substantial plane of the rear edge of said peripheral flange.

5. In a bracket of the character described, a member having a front face and an angularly extending peripheral flange of stepped cross section, said member having an aperture in the front step thereof for receiving a portion of a fixture supported by said bracket, and a backing plate fixed to said member at the rear of said aperture and in a second step thereof, said backing plate having apertures therein, a pair of eyelets formed from the material of said second step and extending rearwardly therefrom through said apertures for engaging the material bounding said apertures in said backing plate, said fixture portion being welded to said backing plate and being supported thereby and being supported at a spaced point therefrom by the material bounding said aperture in said front step, the welded portion of said backing plate being substantially in the plane of the rear edge of said peripheral flange.

ROY S. SANFORD.